April 30, 1968     L. J. KONOPKA     3,380,492
SAW AND MITER GUIDE
Filed April 21, 1966
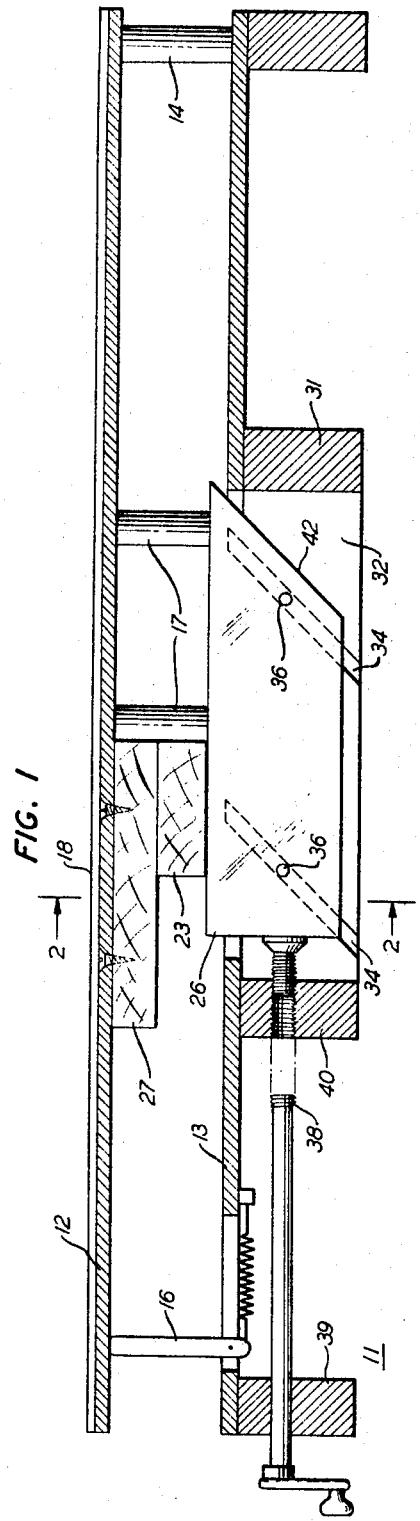
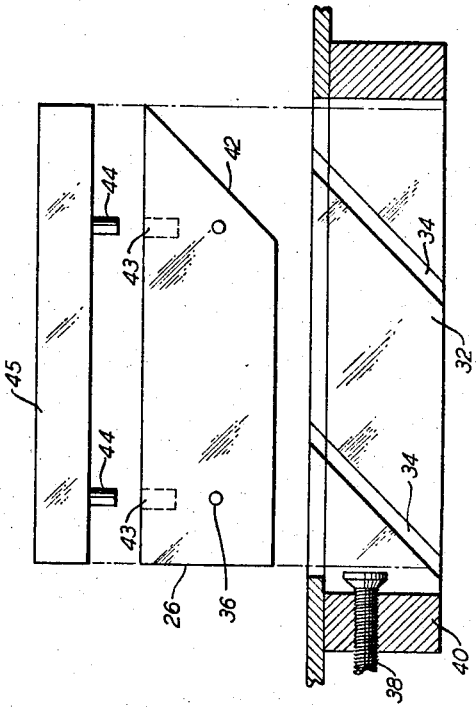
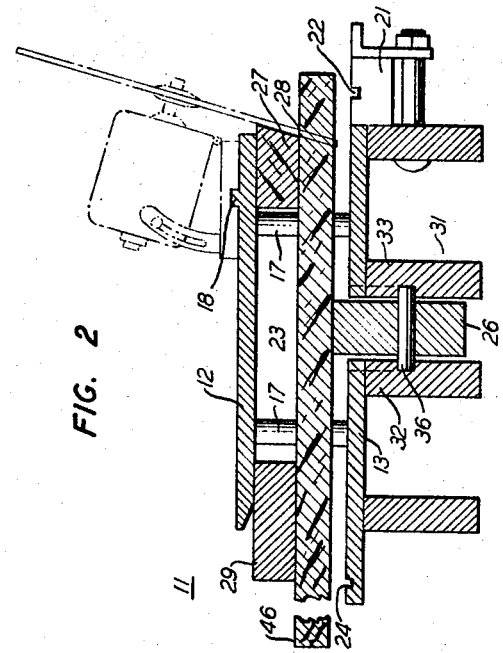
INVENTOR
LEO J. KONOPKA
BY
*Roderick B Anderson*
ATTORNEY

United States Patent Office 3,380,492
Patented Apr. 30, 1968

3,380,492
SAW AND MITER GUIDE
Leo J. Konopka, 72 Rockwood Road,
Florham Park, N.J. 07932
Filed Apr. 21, 1966, Ser. No. 544,295
5 Claims. (Cl. 143—6)

This invention relates to saw and miter guides, and more particularly, to guides for use with portable power driven rotary saws.

In my Patent No. 3,168,126, issued Feb. 2, 1965, there is described a unique saw and miter guide which greatly facilitates the miter cutting of wooden boards and other saw-penetrable work pieces. A portable rotary saiw is mounted on a longitudinal guide on an upper table, which in turn is mounted by several support posts on a lower table. The blade of the rotary saw overhangs the upper table and extends down to the lower table so that a workpiece inserted between the upper and lower tables can be cut as the rotary saw is moved along the longitudinal guide. A strip of wood or the like is inserted in the lower table in which the rotary blade cuts a track for giving a visual indication of the path of the blade. Four of the support posts are arranged in corners of a square so that the work piece can be abutted against any two of the posts for giving 90 degree or 45 degree cuts. A slideable guide stop is provided against which the work piece can be abutted for giving cuts at intermediate angles.

While the saw and miter guide of my patent is admirably suited for making perpendicular cuts, it is difficult to use for making beveled cuts in work pieces. If the saw blade extends entirely through the work piece for a perpendicular cut, it may not extend entirely through it when it is pivoted for a bevel cut. Further, it is difficult to ascertain the path of the rotary saw blade along the top surface of the work piece when a bevel cut is being made.

Accordingly, it is an object of this invention to increase the flexibility of portable saw miter guides so that they can be used for, among other things, making beveled cuts in work pieces.

These and other objects of the invention are attained in an illustrative embodiment thereof comprising a saw and miter guide of the general type described above for supportng a portable rotary saw. Mounted on the lower surface of the upper table is a removable guide spacer which extends along part of the side edge of the upper table. Before a beveled cut in a work piece is made, the rotary saw is used to cut the guide spacer at the desired beveled angle to give a visual indication of the path of the blade.

Mounted in a housing in the lower table is a clamping member having a pair of guide pins that extend into diagonal slots in opposite walls of the housing. The clamping member can be elevated by threading into the housing a screw that abuts against the clamping member. The axial force by the screw makes the clamping member guide pins "ride" up the diagonal slots. Hence, by threading the screw to elevate the clamping member, a work piece can be securely clamped between the clamping member and the guide spacer. The pre-cut edge of the guide spacer then gives the operator a precise indication of the path along the upper surface of the work piece at which the rotary saw blade will make its cut. After precise alignment, the work piece is cut, and is then released by backing off the screw that controls the clamping member.

It can be seen that my new combination, when incorporated into the apparatus of the aforementioned Konopka patent, greatly facilitates the ease and accuracy with which bevel cuts can be made. These and other objects and features of the invention will be better appreciated from a consideration of the following detailed description, taken in conjunction with the accompanying drawing, in which:

FIG. 1 is a sectional view of one embodiment of the invention;

FIG. 2 is a sectional view taken along lines 2—2 of FIG. 1; and

FIG. 3 is an exploded view of the clamping member and housing of FIGS. 1 and 2.

Referring now to FIGS. 1 and 2 there is shown a saw and miter guide 11 comprising an upper table 12 and a lower table 13. The upper table is supported and spaced from the lower table by end posts 14 and 16 and intermediate posts 17. Extending along the upper surface of the upper table is a longitudinal guide 18 which is adapted for insertion into a matching groove of a portable rotary saw as is shown in phantom in FIG. 2. As is described in the aforementioned Konopka patent, the purpose of a saw and miter guide of this type is to facilitate the sawing of work pieces at any desired angle by means of a rotary saw which can be guided along the upper table by the guide 18.

When the blade of the saw is oriented in a vertical plane, it penetrates a wooden strip 21 to form a groove 22 that gives a visual indication of the path of the saw blade. The intermediate posts 17 are arranged to form a square so that a work piece 23 can be abutted against any two of the intermediate posts for positioning at angles of either 90 degrees or 45 degrees with respect to the path of the saw blade. As described in the Konopka patent, a movable guide stop can be inserted in groove 24 for abutment against the work piece. By appropriately moving the guide stop, the work piece can be oriented at any desired angle with respect to the path of the saw blade. The end post 16 shown in FIG. 1 is preferably retractable as shown to facilitate insertion of the work piece 23 between the upper and lower tables.

A cursory examination of the device of the Konopka patent shows that it is difficult to make bevel cuts in a work piece because such an operation requires that the saw blade be pivoted out of the groove 22 in the strip 21. In accordance with the present invention, this problem is overcome by providing a clamping member 26 within the lower table 13 for elevating the work piece 23 so that it can be cut at a bevel by a saw blade that is pivoted at an angle as shown in FIG. 2. Attached to the lower surface of the upper table 12 is a guide spacer 27 which serves to displace the work piece from the upper table 12, to cooperate with the clamping member 26 to secure the work piece firmly in position, and also to give a visual indication of the path of the saw blade. Before the work piece is cut, the guide spacer 27 which is made of wood or other saw-penetrable material, is cut by the saw blade which has been pivoted at the proper bevel angle. This preliminary cut defines an edge 28 which gives the operator a visual indication of the path of the saw blade. Hence, before firmly clamping the work piece in position, the operator can adjust it so that the desired path of the saw blade corresponds precisely to the edge 28. Before the work piece is finally clamped into position, a second spacer 29 is preferably inserted between the work piece and the upper table for stabilizing the work piece. Spacers 27 and 29 are, of course, of the same thickness.

The clamping member 26 is mounted within a housing 31 having opposite side walls 32 and 33. Each of the side walls include a pair of diagonal slots 34 which are best shown in the exploded view of FIG. 3. Extending through the clamping member 26 are a pair of guide pins 36 which are each mounted in opposite diagonal grooves 34. A threaded screw member 38 extends through lower support members 39 and through an end wall 40 of the housing 31. The aperture in member 40 through which the screw 38 extends is threaded so that an appropriate rotation of the screw drives it into the housing 31 so that it abuts against the clamping member 26.

As the screw member 38 is progressively threaded into the housing, it pushes on the clamping member 26 and forces the guide pins 36 to ride diagonally upwardly in the slots 34. This, of course, forces the clamping member 26 upwardly to engage work piece 23 and eventually to clamp it firmly against spacer 27. When the work piece 23 is to be removed, the screw member 38 is rotated in the opposite direction causing the clamping member 26 to settle and to release the work piece.

The diagonal grooves 34 in the side walls 32 and 33 should, of course, all be parallel. Their slope depends upon the desired mechanical advantage of the mechanism, but it should not be so steep as to cause binding of the pins 36. One end 42 of the clamping member is formed at an angle substantially parallel with diagonal slots 34 so that the clamping member is free to rise and settle without abutting against the lower table 13.

As shown in FIG. 3, the clamping member may include a pair of apertures 43 for receiving support pins 44 of a spacer 45. When spacer 45 is inserted in clamping member 26, the elevation of clamping member 26 required for securing a work piece is substantially reduced. Hence, when a relatively thin work piece 23 is to be cut, the spacer 45 is inserted for reducing the number of rotations of screw 38 required for clamping the work piece into position. If a thicker work piece is later to be cut, spacer 45 is removed to reduce the height of the clamping member.

If a relatively long work piece is used, a second housing and clamping member can be advantageously located below the extreme end 46 of the work piece 23 for additional support. This particular clamping member may then be elevated to the same height as clamping member 26, for giving added stability to the work piece during the cutting operations. The spacer 27 is shown as extending along only a small portion of the upper table 12 although, of course, it could be made much longer if a longer edge 28 were desired for more precisely orienting a relatively wide work piece 23. The Konopka patent describes various other features such as removable posts in addition to the intermediate posts for aiding in the positioning of work piece 23 at various cutting angles. Such features could be used, of course, with equal advantage in the present device. Various other modifications and embodiments may be made by those skilled in the art without departing from the spirit and scope of the invention.

What is claimed is:
1. A saw and miter guide comprising:
upper and lower tables each having front, side, and rear edges;
the upper table comprising means for supporting a power-driven rotary saw in such a manner that the rotary blade of the saw overhangs a first side edge of the upper table;
means extending substantially from the front to the rear of the upper table for guiding the saw along a substantially straight line;
means comprising a flat saw-penetrable member attached to the bottom surface of the upper table, overlapping the first side edge of the upper table, and extending in a plane parallel to the upper table, for giving a visual indication of the path of the rotary saw blade and for displacing a workpiece from the upper table;
means comprising a plurality of support posts for supporting the upper table on the lower table;
a housing mounted in the lower table;
a clamping member mounting in the housing;
and means for elevating the clamping member for clamping a workpiece against the saw-penetrable member.

2. The saw and miter guide of claim 4 wherein: the end of the clamping member opposite the screw is tapered at an angle substantially parallel to the guide slots.

3. The saw and miter guide of claim 4 further comprising:
a spacer having a pair of support pins extending from a bottom surface;
a pair of apertures in the top surface of the clamping member for receiving the support piece.

4. A saw and miter guide comprising:
upper and lower tables each having front, side, and rear edges;
the upper table comprising means for supporting a power-driven rotary saw in such a manner that the rotary blade of the saw overhangs the side edge of the upper table;
means extending substantially from the front to the rear of the upper table for guiding the saw along a substantially straight line;
means comprising a plurality of support posts for supporting the upper table on the lower table;
a housing mounted in the lower table;
a clamping member mounted in the housing;
a pair of guide pins extending through the clamping member, each of said pins being mounted at its ends in guide slots in side walls of the housing;
the guide slots being parallel and extending diagonally upwardly in the side walls of the housing;
and means for elevating the clamping member comprising a screw adapted for axial movement and abutting at one end against the clamping member.

5. The saw and miter guide of claim 1 wherein:
the upper table is made of metal;
the strip of saw-penetrable material is screwed to the lower surface of the upper table so as to overlap the side edge of the metal upper table;
and further comprising a spacer of the same thickness as the saw-penetrable strip and adapted for insertion between the work piece and the lower surface of the upper table to stabilize the work piece when it is clamped in position.

References Cited

UNITED STATES PATENTS

| 2,655,956 | 10/1953 | Taylor | 143—6 |
| 2,940,484 | 6/1960 | Neilson | 143—6 |
| 2,949,139 | 8/1960 | Nolte | 143—6 |
| 3,168,126 | 2/1965 | Konopka | 143—6 |
| 3,320,982 | 5/1967 | Kwiatkowski | 143—6 |

DONALD R. SCHRAN, *Primary Examiner.*